No. 889,679. PATENTED JUNE 2, 1908.
C. B. HATFIELD.
SELF PROPELLED VEHICLE.
APPLICATION FILED JAN. 26, 1907.
3 SHEETS—SHEET 1.
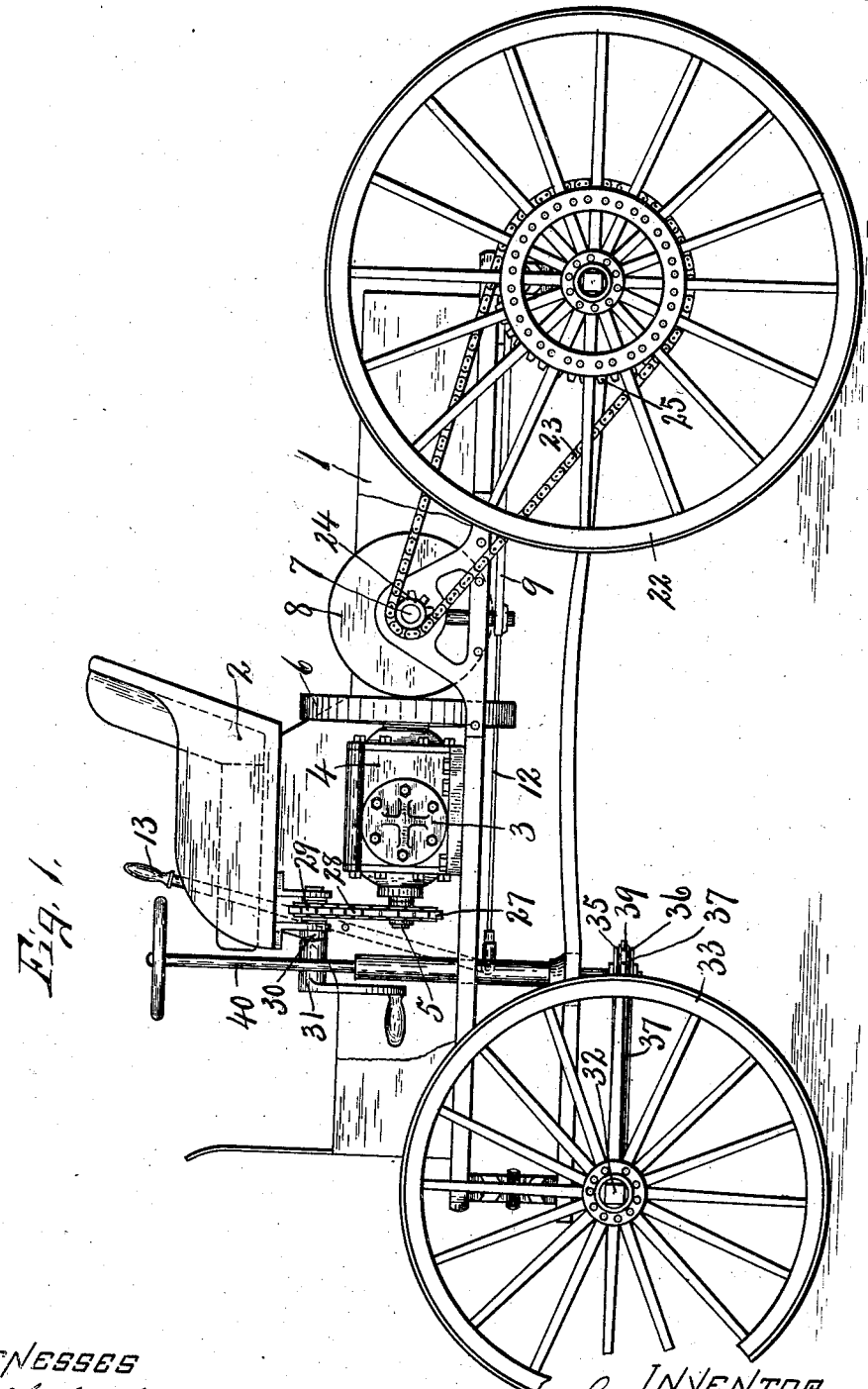

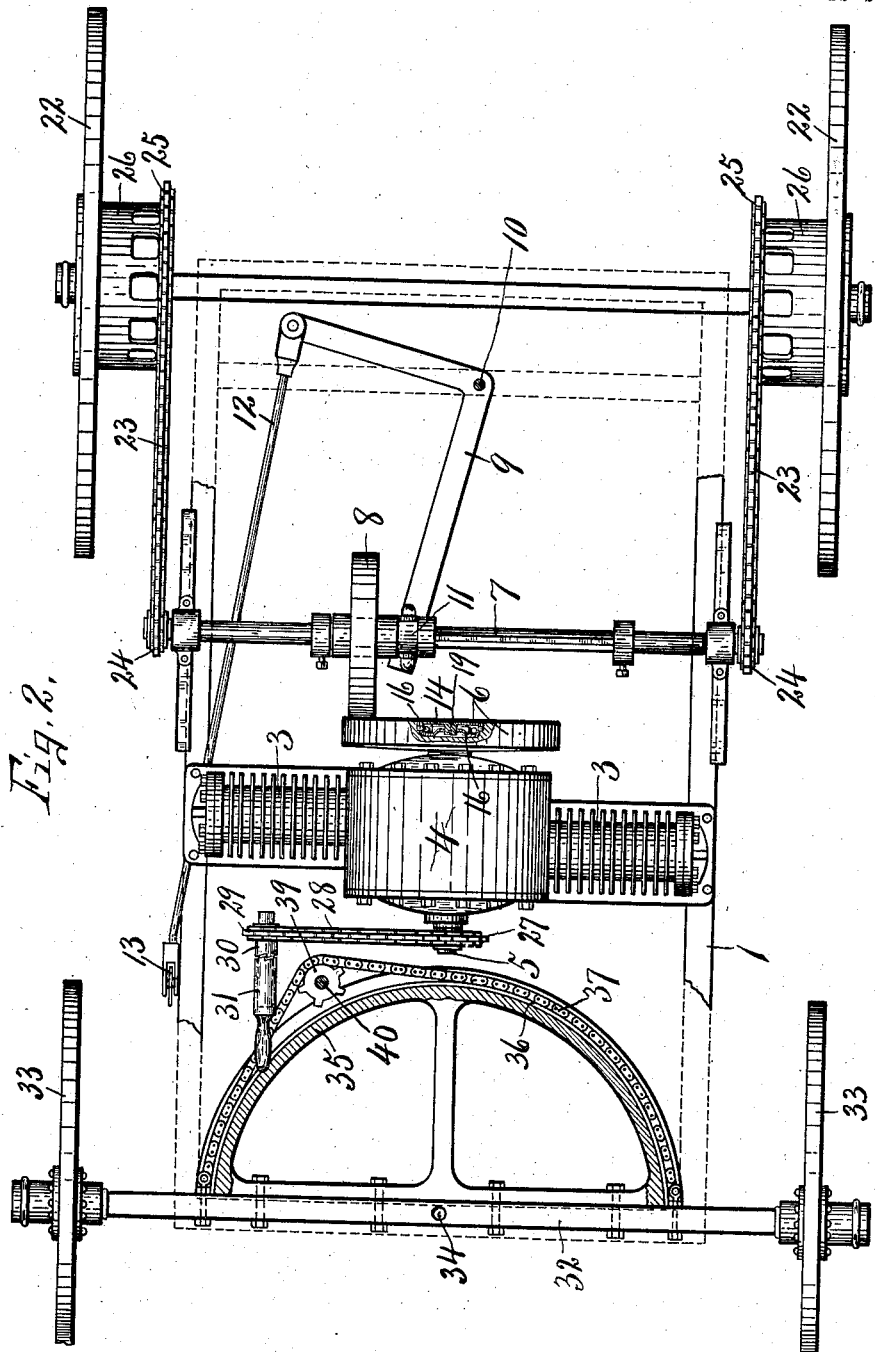

No. 889,679. PATENTED JUNE 2, 1908.
C. B. HATFIELD.
SELF PROPELLED VEHICLE.
APPLICATION FILED JAN. 26, 1907.
3 SHEETS—SHEET 3.
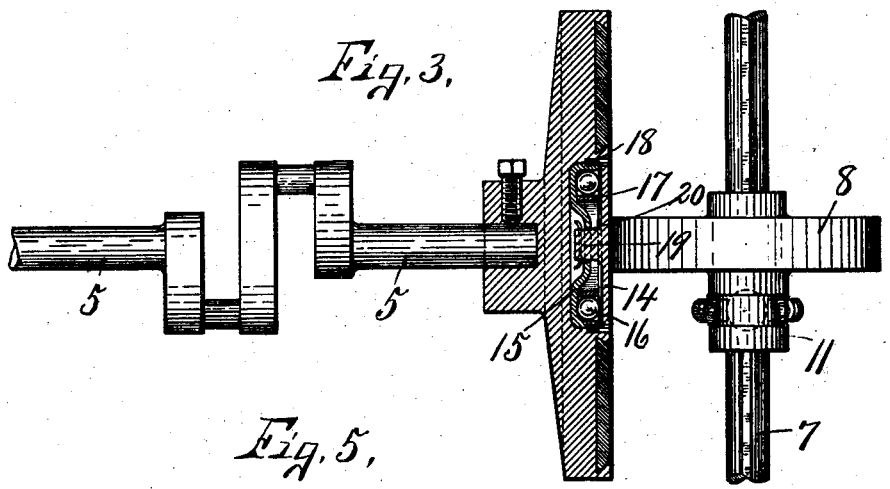
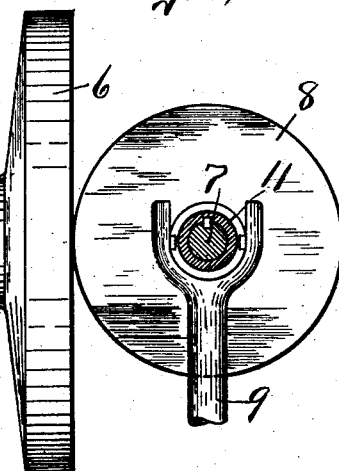
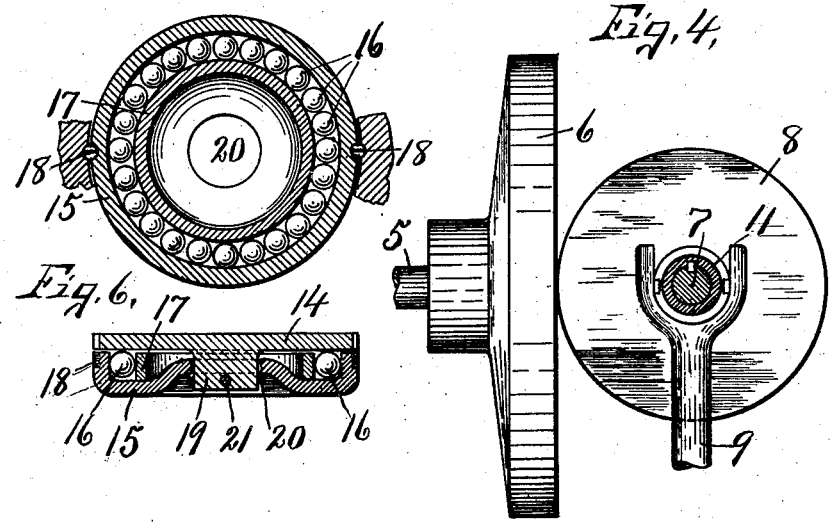
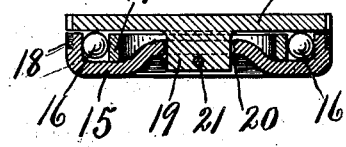
WITNESSES
Chas. H. Hughes
Wm. E. Chase
INVENTOR
C. B. Hatfield
BY
Howard P. Denison
ATTORNEY

UNITED STATES PATENT OFFICE.

CHARLES B. HATFIELD, OF CORTLAND, NEW YORK, ASSIGNOR TO HATFIELD MOTOR VEHICLE COMPANY, OF CORTLAND, NEW YORK, A CORPORATION OF NEW YORK.

SELF-PROPELLED VEHICLE.

No. 889,679.  Specification of Letters Patent.  Patented June 2, 1908.

Application filed January 26, 1907. Serial No. 354,308.

*To all whom it may concern:*

Be it known that I, CHARLES B. HATFIELD, of Cortland, in the county of Cortland, in the State of New York, have invented new and useful Improvements in Self-Propelled Vehicles, of which the following, taken in connection with the accompanying drawings, is a full, clear, and exact description.

This invention relates to certain improvements in self-propelled vehicles in which one or more liquid hydro-carbon engines of the compression type are employed as the motive power and refers more particularly to the mechanism for transmitting motion from the motor to one or more traction wheels of the running gear.

Heretofore the use of hydro-carbon engines as a motive power for vehicles has always implied the use of some form of clutch or disconnecting device whereby the engine could be operated independently of the traction wheels or intermediate power transmitting mechanism but in my present invention I have sought to accomplish the same ends without at any time disconnecting the motor from the traction wheels or in other words I have sought to provide a simple, practical and efficient variable speed-reverse-drive mechanism by which I am enabled to maintain a permanent connection between the driving and driven elements, thereby avoiding the use of what is commonly known as a clutch or disconnecting device.

A further object is to dispose the motors and power transmitting mechanism connecting it to the traction wheels in such manner as to reduce the number of parts of the driving mechanism to a minimum and at the same time to avoid, as far as practical, excessive vibration of the vehicle while the engine is in action.

Other objects and uses relating to the propelling mechanism will be brought out in the following description.

In the drawings,—Figure 1 is a side elevation of a self-propelled vehicle equipped with my various improvements, a part of the body being broken away to show the various mechanisms mounted thereon. Fig. 2 is a top plan of the detached running gear showing particularly the propelling mechanism. Fig. 3 is an enlarged top plan partly in section of the friction driving and driven elements and the adjacent portions of their supporting shafts. Fig. 4 is a side view of the friction driving and driven elements as seen in Fig. 3. Fig. 5 is a further enlarged sectional view of what will be hereafter termed the floating rest which is located in the center of the friction driving disks. Fig. 6 is a sectional view taken on line 6—6, Fig. 5.

The friction driving and driven disks herein illustrated and described are quite similar to those shown in my pending application No. 308,045, filed March 26, 1906, and allowed September 22, 1906, but in that case the device was claimed in the general class of friction gearing without attempting to show its specific application to self-propelled vehicles as in my present application and I, therefore, wish to emphasize the limitations in the present case of such friction driving mechanism to self-propelled vehicles as hereinafter more fully described and claimed.

In the drawings, particularly Figs. 1 and 2, I have shown a double hydro-carbon gas engine as mounted transversely upon or within the body —1— of a vehicle and preferably beneath the seat as —2—, said engine being provided with opposed cylinders —3— which are connected to a common crank case —4— containing an ordinary crank shaft —5—. This transverse arrangement of the double cylinder engine brings the crank shaft —5— substantially central and lengthwise of the body —1— and preferably to the rear end of this shaft is rigidly secured a friction driving disk —6— having a substantially flat friction face at right angles to its axis of rotation.

Directly at the rear of the friction driving disk —6— and upon the body of the vehicle is rotatingly mounted a transverse shaft —7— having feathered thereon a friction driven disk —8— which engages the friction face of the disk —6— and is movable axially of itself and radially to and from the center of the disk —6— and at opposite sides of the axis of the latter to permit the vehicle to be driven in reverse directions.

The friction face of the driving disk —6— and shaft —7— are disposed in fixed relation to and parallel with each other and, therefore, the disk —8— is in permanent contact therewith as it is moved back and forth radially across the face of the driving disk.

Any suitable means may be employed for shifting the driven disk —8— axially and for this purpose I have shown a bell crank lever —9— as pivoted at —10— to the under side of the body —1—, one of the arms of said bell crank being connected to a grooved hub —11— of the disk —8— while the other arm of said lever is connected by a link —12— to an operating lever —13—, the latter being located at the right of and in close proximity to the seat of the vehicle where it is within easy reaching distance of the operator. It is evident, however, that any other equivalent mechanism may be employed for shifting the disk —8— axially across the face of the disk —6—, the essential purpose being to arrange the shaft parallel with the friction face of the disk —6— so that the disk —8— will always maintain contact therewith when traversing its face for differential speeds and reversed drive.

A comparatively small concentric portion of the friction face of the disk —6— is loose therein constituting what may be termed a floating rest —14— which in this instance consists of a comparatively thin circular disk which is seated in a central opening of substantially the same diameter in the face of the disk —6— and is preferably mounted in a separate annular support —15— carrying an annular series of interposed antifriction balls —16— near the outer edges of the rest —14— to prevent excessive torsional strains upon said rest as the disk —8— is moved transversely thereof, said annular series of balls also serving to keep the friction face of the floating rest —14— substantially coincident with the friction face of the disk —6— so that there may be no obstructions to the free transposition of the disk —8— across the face of the driving disk.

The support —15— contains a loose annulus —17— forming with the outer flanges of the support —16— an annular race-way for the balls and serving to retain the latter in place against inward displacement.

The floating rest —14— and its support —15— are preferably made of hardened metal to constitute a more efficient bearing for the balls —16—, the support —15— being locked from independent rotation to the disk —6— by means of screw keys or pins —18— as best seen in Figs. 3, 5 and 6.

In order that the floating rest —14— may be held against outward axial displacement when the driven disk —8— is out of contact therewith, I provide said floating rest with a central hub —19— which projects through a central opening —20— in the support —15— and is provided with a transverse aperture for receiving a locking pin or key —21— at the inner side of the opening —20—, said key serving to hold the floating rest against outward displacement and at the same time permits the free rotation of the disk —6— and support —15— independently of the floating rest —14—.

I have now fully described the means for transmitting motion from the crankshaft of the engine to the shaft —7— and it is evident that by shifting the disk —8— radially of the disk —6— toward and from the center the shaft —7— will be rotated with variable speeds and when the disk —8— is brought to the center to rest upon the loose or floating rest —14— the crank shaft may continue to revolve without transmitting rotary motion to the disk —8— thereby leaving the shaft —7— and traction wheels connected thereto at rest.

The shaft —7— is connected to one or both, in this instance both of the rear traction wheels —22— through the medium of one or more, in this instance two, sprocket chains —23— which are connected to sprocket wheels —24— on the shaft —7— and to additional somewhat larger sprocket wheels —25— on inwardly projecting hubs —26— of the traction wheels —2—.

Secured to the front end of the crankshaft —5— of the engine is a sprocket wheel —27— which is connected by a chain —28— to an additional sprocket wheel —29— journaled in suitable bearings on the body of the vehicle and having a clutch section —30— to which may be connected a crank clutch section —31— adapted to be operated by hand for starting the engine, it being understood, of course, that when the engine is stopped, ready for starting, the friction driven disk —8— bears against the center floating rest —14— so as to relieve the engine from any external load.

The front axle as —32— is provided with steering wheels —33— and is centrally pivoted at —34— midway between its ends to permit the axle to be turned in steering the vehicle.

Any suitable steering mechanism may be employed in connection with the driving mechanism forming the subject matter of this invention, and for this purpose I have shown a segment —35— as secured to the axle —32— concentric with the pivot —34—, said segment being provided with a peripheral groove —36— in which is seated the greater portion of a chain —37— said chain being engaged by a sprocket wheel —39— on the lower end of a steering post —40— as best seen in Figs. 1 and 2. This sprocket wheel —39— is located in the plane of the groove —36— in the periphery of the segment —35—, the groove serving to guide the chain and to retain it in operative position against vertical displacement. This steering mechanism, however, forms no part of my present invention and will be claimed in a subsequent application, the only purpose in illustrating it being to show a complete operative device.

In the operation of my present invention, assuming that the friction disk —8— is normally engaged with the floating rest of the driving disk —6—, the engine may be started through the medium of the crank clutch —31— and sprocket chain —28— whereupon the crank clutch is automatically disconnected in any well known manner and the driven disk —8— may then be shifted in either direction by means of the lever —9—, link —12— and hand lever —13— transversely from the center of the disk —6— according to the direction in which it is desired to propel the vehicle thereby transmitting motion to the shaft —7— and traction wheels —2— through the medium of the sprocket chains —23—. The stopping and starting of the traction wheels is thereby effected without disconnecting the driven disk —8— from the driving disk —6—, that is the driven disk —8— maintains a permanent connection with the driving disk —6— during the stopping, starting and reverse drive of the vehicle, which is the essential feature of my present invention. Otherwise the invention is described in such full, clear and exact terms as to enable any one skilled in the art to construct and operate the same.

What I claim is:

In a self-propelled vehicle, a body and a running gear having a traction wheel, a liquid hydro-carbon engine mounted on the body of the vehicle and provided with opposed cylinders arranged transversely of the body, said engine having a crank shaft extending lengthwise of the body, a friction disk secured directly to the crank shaft and provided with a central floating rest concentric with its axis, the friction face of the floating rest being coincident with the remaining portion of the friction face of the driving disk, a shaft mounted transversely on the body parallel with the friction face of the driving disk, a second friction disk rotating with the shaft in permanent contact with the friction face of the driving disk and movable axially, means for moving said second disk axially in a diametric line across the face of the driving disk, and means for transmitting motion from the shaft to the traction wheel.

In witness whereof I have hereunto set my hand this 3d day of December 1906.

CHARLES B. HATFIELD.

Witnesses:
H. E. CHASE,
HOWARD P. DENISON.